Nov. 18, 1958     M. M. REICHARDT     2,860,406

ROLLER BEARING RETAINER MEANS

Filed Feb. 20, 1956

INVENTOR.
Mayo M. Reichardt
BY
L. D. Burch
ATTORNEY

United States Patent Office 2,860,406
Patented Nov. 18, 1958

2,860,406

ROLLER BEARING RETAINER MEANS

Mayo M. Reichardt, Milford, Mich., assignor to General Motors Corporation, Detroit, Mich., a corporation of Delaware Application February 20, 1956, Serial No. 566,644

1 Claim. (Cl. 29—201)

This invention relates to means for retaining roller bearings or the like within a cylindrical enclosure as by keystoning.

Roller bearings are usually assembled within a gear or other member by the use of a dummy plug; the bearings being circumferentially disposed about a dummy plug member which, with the bearings, is retained within the gear member until displaced by the shaft member upon which the gear is later to be rotatably mounted. Such dummy plugs must be machined to close tolerances to give a snug close fit so that they will not be dislodged prior to the later assembly operation. This method also requires unusually careful handling of rotatable members having the roller bearings assembled therein.

It is now proposed to provide an improved means of retaining roller bearings within a receiving member as by making use of a dummy plug member which, with roller bearings disposed circumferentially thereof, may be readily disposed within another member intended to receive such bearings. Means are provided with the dummy plug for keystoning the roller bearings within the receiving member and thereby locking the bearings to the receiving member and retaining the plug. Such means is readily removable, when the plug itself is replaced, and is inexpensive in comparison with the close plug tolerances and careful handling previously required.

The illustrated embodiment of the proposed retainer means shows a cylindrical member 10, tubular in form, about which a plurality of roller bearings 12 may be circumferentially disposed. Apertures 14 and 16 are formed through member 10, near each end thereof, and communicate with passage 18 through the dummy plug member.

Figure 1:
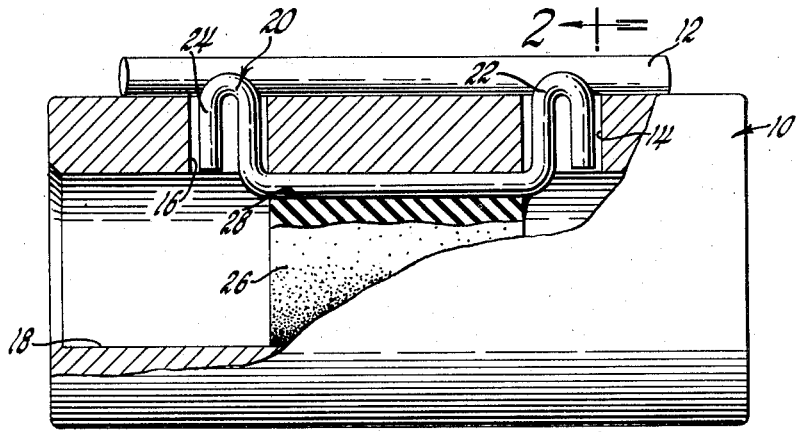
Figure 1 is a side elevational view of the proposed bearing retainer means having a part broken away and shown in cross-section.

A spring wire member 20 having opposite ends bent to form spring fingers or projections 22 and 24, spaced apart the distance between apertures 14 and 16, is disposed within passage 18 with the fingers 22 and 24 projecting through apertures 14 and 16 beyond the surface of the cylindrical member 10. A rubber-like plug 26, having a flat side 28, is disposed within passage 18 to retain the spring fingered member 20 in place as shown in Figures 1 and 2.

Figure 2:
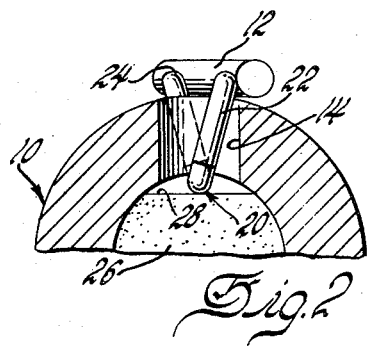
Figure 2 is a partial cross-sectional view of the proposed retainer means taken in the plane of line 2—2 of Figure 1 looking in the direction of the arrows thereon.
Figure 3:
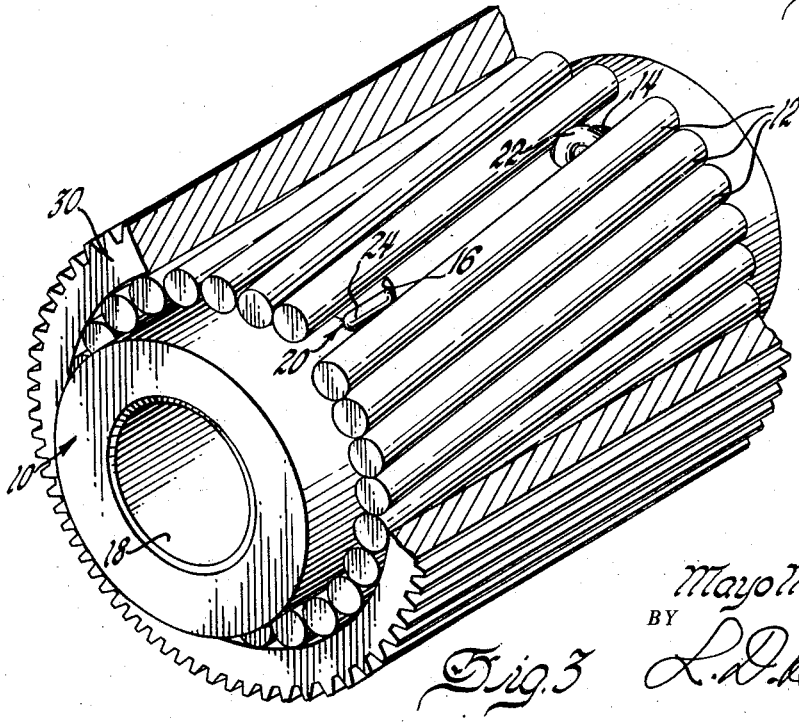
Figure 3 is a schematic view of the proposed retainer means, in use, having a part of the receiving member broken away.

The fingers 22 and 24 at opposite ends of member 20 are offset as shown by Figure 2 and are adapted to be received between the roller bearings 12. This in turn offsets the ends of the adjacently disposed bearings and each next consecutively adjacent roller bearing. The roller bearings, as assembled within a gear member or other cylindrical enclosure 30, thus have their ends raised from the surface of the cylindrical plug member 10, as shown in Figure 2, increasing the outer diametrical measurements to effect the self-locking character known as keystoning.

The spring fingers 22 and 24 are sufficiently yieldable to permit the roller bearings to be axially aligned with the cylindrical plug 10, or at least enough to allow ready assembly of the plug and its roller bearings within the receiving member 30. The tension of fingers 22 and 24 determines the snugness with which the bearings are retained within the receiving member.

I claim:

Means for keystoning roller bearings within a cylindrical shell which includes, a tubular member adapted to receive a plurality of roller bearings circumferentially thereof, apertures provided through said tubular member near opposite ends thereof, a spring wire member having offset spring fingers formed from opposite ends thereof, said spring wire member being received within said tubular member with said fingers received through said apertures, and a removable plug received within said tubular member for retaining said spring wire member therewithin, said spring fingers being receivable between adjacent of said roller bearings and circumferentially offsetting the ends thereof and of the others of said roller bearings into keystoned engagement with said cylindrical shell.

References Cited in the file of this patent

UNITED STATES PATENTS

| | | |
|---|---|---|
| 1,477,164 | Close | Dec. 11, 1923 |
| 1,947,004 | Goddard | Feb. 13, 1934 |
| 2,215,134 | Rehnberg | Sept. 17, 1940 |
| 2,672,680 | Gerner | Mar. 23, 1954 |